United States Patent
Komori et al.

(10) Patent No.: US 10,581,077 B2
(45) Date of Patent: Mar. 3, 2020

(54) ELECTRODE FOR SECONDARY CELL

(71) Applicant: HONDA MOTOR CO., LTD., Minato-Ku, Tokyo (JP)

(72) Inventors: Takahiro Komori, Saitama (JP); Ryogo Sakamoto, Saitama (JP); Akihisa Tanaka, Saitama (JP); Kazuki Saimen, Saitama (JP); Takuya Nishinuma, Saitama (JP); Toshio Tokune, Saitama (JP); Hidefumi Nikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 215 days.

(21) Appl. No.: 15/794,475

(22) Filed: Oct. 26, 2017

(65) Prior Publication Data

US 2018/0151881 A1    May 31, 2018

(30) Foreign Application Priority Data

Nov. 28, 2016  (JP) ................. 2016-230417

(51) Int. Cl.
*H01M 4/583* (2010.01)
*H01M 4/66* (2006.01)
*H01M 4/02* (2006.01)

(52) U.S. Cl.
CPC ........... *H01M 4/583* (2013.01); *H01M 4/661* (2013.01); *H01M 4/663* (2013.01); *H01M 2004/026* (2013.01)

(58) Field of Classification Search
CPC ...... H01M 4/583; H01M 4/661; H01M 4/663; H01M 2004/026
See application file for complete search history.

(56) References Cited

U.S. PATENT DOCUMENTS 8,974,971 B2    3/2015  Yuasa et al.

FOREIGN PATENT DOCUMENTS

| JP | 2013-065482 A |   | 4/2013 |
|----|---------------|---|--------|
| JP | 2016-031922   | * | 3/2016 |
| JP | 2016-031922 A |   | 3/2016 |
| JP | 2016-054113 A |   | 4/2016 |

OTHER PUBLICATIONS

Office Action dated Oct. 1, 2019 issued in corresponding Japanese patent application No. 2016-230417.

* cited by examiner

*Primary Examiner* — Laura Weiner
(74) *Attorney, Agent, or Firm* — Carrier Blackman & Associates, P.C.; Joseph P. Carrier; Fulchand P. Shende

(57) ABSTRACT

Provided is an electrode for a secondary cell capable of obtaining excellent output values and input values when used in the secondary cell. The electrode for a secondary cell is formed of an electrode mixture layer molded body formed of an active material and at least one of a carbon nanotube and a three-dimensional carbon nanotube fiber bundle skeleton formed of a plurality of carbon nanotubes that intersect one another to form an aggregation, which are in intimate contact with the surface of the active material; and a current collector layered on the electrode mixture layer molded body. The electrode mixture layer molded body includes a first roughened surface, and the current collector includes a second roughened surface. The first roughened surface of the electrode mixture layer molded body and the second roughened surface of the current collector are pressed and attached to each other.

3 Claims, No Drawings

ELECTRODE FOR SECONDARY CELL

BACKGROUND OF THE INVENTION

Field of the Invention

The present invention relates to an electrode for a secondary cell.

Description of the Related Art

In recent years, using a carbon nanotube molded body as an electrode for a secondary cell has been studied. As the electrode for a secondary cell, for example, there is a known electrode-current-collector that is a three-dimensional fiber composite formed of a carbon nanotube molded body with a particulate active material contained in three-dimensional air gaps in the composite (see Japanese Patent Laid-Open No. 2016-31922, for example).

The three-dimensional fiber composite is formed of a three-dimensional carbon nanotube fiber bundle skeleton, which is formed by integrating a plurality of carbon nanotubes that intersect one another to form an aggregation, and an electrical conductor formed of carbon nanotubes. In the electrode-current-collector, the active material is in intimate contact with and held by the three-dimensional carbon nanotube fiber bundle skeleton or the electrical conductor formed of carbon nanotubes.

However, in a secondary cell using an electrode formed of the electrode-current-collector described in Japanese Patent Laid-Open No. 2016-31922 used as an electrode mixture layer molded body and layered on a separate current collector, it is undesirably difficult to obtain sufficient input values and output values.

SUMMARY OF THE INVENTION

An object of the present invention is to provide an electrode for a secondary cell that solves the problem described above and is capable of, when used in a secondary cell, obtaining excellent output values and input values.

The present inventors have intensively examined a reason why when an electrode formed of the electrode mixture layer molded body, in which a particulate active material is contained in three-dimensional air gaps in the three-dimensional composite formed of a carbon nanotube molded body, laminated on a separate current collector is used in a secondary cell, it is difficult to provide sufficient output values and input values in the secondary cell.

As a result, the present inventors have found that since the electrode mixture layer contains no resin such as polyvinylidene fluoride (PVDF) as a binding material, the degree of binding between the electrode mixture layer molded body and the current collector is insufficient and the contact resistance between the electrode mixture layer molded body and the current collector is large in relation to electron conduction. The contact resistance is one factor that affects the output and input values of a secondary cell, and it is desirable that the contact resistance is small in order to improve the output and input values of the secondary cell.

The present inventors have advanced the study on the basis of the findings described above to find that the contact resistance can be lowered by roughening a surface of the electrode mixture layer molded body facing the current collector, roughening a surface of the current collector facing the electrode mixture layer, and pressing and attaching the electrode mixture layer and the current collector to each other through the roughened surfaces. The present inventors have thus attained the present invention.

To achieve the object described above, an electrode for a secondary cell of the present invention, including: an electrode mixture layer molded body formed of an active material and at least one of a carbon nanotube and a three-dimensional carbon nanotube fiber bundle skeleton formed of a plurality of carbon nanotubes that intersect to form an aggregation, which are in intimate contact with a surface of the active material; and a current collector layered on the electrode mixture layer molded body. The electrode mixture layer molded body has a first roughened surface on a side facing the current collector, and the current collector has a second roughened surface on a side facing the electrode mixture layer molded body. The first roughened surface of the electrode mixture layer molded body and the second roughened surface of the current collector are pressed and attached to each other.

According to the electrode for a secondary cell of the present invention, the first roughened surface formed on a surface of the electrode mixture layer molded body, the surface facing the current collector, and the second roughened surface formed on a surface of the current collector, the surface facing the electrode mixture layer molded body, are pressed and attached to each other to allow the electrode mixture layer molded body and the current collector to be layered on each other. As a result, the first and second roughened surfaces mechanically interwind with each other, whereby the area or the number of points of the contact between the electrode mixture layer molded body and the current collector can be increased and the contact resistance therebetween can be lowered accordingly.

The electrode for a secondary cell according to the present invention can therefore provide, when the electrode is used as a positive electrode in a secondary cell, excellent output values and input values in the secondary cell.

In the electrode for a secondary cell according to the present invention, the current collector can be formed of a metal foil. In this case, when the metal foil includes a carbon layer that is made of carbon black or graphite and coats, as the second roughened surface, the surface that faces the electrode mixture layer molded body, or when the metal foil includes, as the second roughened surface, an irregular surface formed on the surface that faces the electrode mixture layer molded body, and therefore the contact resistance between the electrode mixture layer molded body and the current collector can be lowered.

In the electrode for a secondary cell according to the present invention, the second roughened surface of the current collector preferably has an arithmetic average height Sa ranging from 0.13 to 0.80 µm at a point of time before the current collector is layered on the electrode mixture layer molded body. When the second roughened surface including the arithmetic average height Sa in the range described above is pressed and attached to the first roughened surface of the electrode mixture layer molded body, the area or the number of points of the contact between the electrode mixture layer molded body and the current collector is reliably increased, whereby the contact resistance therebetween can be further lowered.

Further, in the electrode for a secondary cell according to the present invention, the first roughened surface of the electrode mixture layer molded body preferably includes an arithmetic average height Sa ranging from 0.07 to 0.41 µm at a point of time before the electrode mixture layer molded body is layered with the current collector. When the first roughened surface including the arithmetic average height Sa in the range described above is pressed and attached to the second roughened surface of the current collector, the area or the number of points of the contact between the electrode mixture layer molded body and the current collector is reliably increased, whereby the contact resistance therebetween can be further lowered.

DETAILED DESCRIPTION OF THE PREFERRED EMBODIMENT

An embodiment of the present invention will next be described in further detail.

An electrode for a secondary cell according to the present embodiment is formed of an electrode mixture layer molded body and a current collector layered on the electrode mixture layer molded body.

The electrode mixture layer molded body is formed of an active material and at least one of a carbon nanotube and a three-dimensional carbon nanotube fiber bundle skeleton formed of a plurality of carbon nanotubes that intersect one another to form an aggregation, which are in intimate contact with the surface of the active material. The thus configured electrode mixture layer molded body can be produced, for example, by dispersing a particulate active material and carbon nanotubes having a predetermined diameter in water to prepare a dispersion liquid, introducing the dispersion liquid into a suction filtration apparatus, where the active material and the carbon nanotubes are deposited on a filter, and separating the deposit from the filter. In this process, some of the carbon nanotubes intersect one another and aggregate into the three-dimensional carbon nanotube fiber bundle skeleton.

The thus produced electrode mixture layer molded body has a first roughened surface having an arithmetic average height Sa (according to ISO 25178) ranging from 0.07 to 0.41 μm.

The current collector can be formed of a metal foil, for example, an aluminum foil, and a second roughened surface can be formed by coating the surface of the metal foil with a carbon layer made of carbon black or graphite. The second roughened surface of the current collector can instead be formed by sintering metal powder on the surface of the metal foil or by etching.

The second roughened surface of the thus produced current collector includes an arithmetic average height Sa (according to ISO 25178) ranging from 0.13 to 0.80 μm.

The electrode for a secondary cell according to the present embodiment can be produced by pressing and attaching the second roughened surface of the current collector to the first roughened surface of the electrode mixture layer molded body. The pressing and attaching can be performed, for example, by a roll press.

The pressing and attaching described above allows the first and second roughened surfaces to mechanically interwind with each other, whereby the area or the number of points of the contact between the electrode mixture layer molded body and the current collector can be increased, and the contact resistance therebetween can be lowered accordingly.

Next, Examples and Comparative Examples will be shown.

Example 1

In the present example, 0.7 mg/ml of carbon nanotubes having a diameter ranging from 10 to 50 nm and a length ranging from 100 to 500 μm and manufactured in accordance with the manufacturing method described in Japanese Patent Laid-Open No. 2016-031922, 7.1 mg/ml of $Li(Ni_{1/3}Co_{1/3}Mn_{1/3})O_2$ as the active material, and 20 mg/ml of lithium dodecyl sulfate as a dispersant were introduced into 150 ml of water and processed for 60 minutes by using an ultrasonic homogenizer operated at an output of 50 W to prepare primary dispersion liquid. In the primary dispersion liquid, the mass ratio between the carbon nanotubes and the active material was 9:91.

The primary dispersion liquid was then processed five times by using a wet atomization apparatus NanoVater (registered trademark) manufactured by Yoshida Kikai Co. Ltd. in a cross-flow process in which the nozzle diameter was 100 μm and the pressure was 200 MPa to prepare secondary dispersion liquid.

The secondary dispersion liquid was then introduced into a suction filtration apparatus, and a mixture of the carbon nanotube and the three-dimensional carbon nanotube fiber bundle skeleton, which is formed of the plurality of carbon nanotubes that intersect one another to form an aggregation, and the active material was deposited on a filter having a pore size of 0.1 μm to produce a deposit.

The deposit was then separated from the filter to produce a sheet-shaped electrode mixture layer molded body (30 mm×40 mm). The electrode mixture layer molded body had a first roughened surface having an arithmetic average height Sa of 0.405 μm immediately after the electrode mixture layer molded body was produced.

Aluminum powder was then sintered on the surface of an aluminum foil having a thickness of 15 μm to form a second roughened surface, and a current collector comprising the second roughened surface was produced. The second roughened surface of the current collector in the present example had an arithmetic average height Sa of 0.791 μm.

The first roughened surface of the electrode mixture layer molded body and the second roughened surface of the current collector produced in the present example were then pressed and attached to each other by using roll press operated at a pressure of 14 MPa to produce an electrode for a secondary cell.

A multi-point resistance measurement apparatus (Model Name: XF507 manufactured by Hioki E.E. Corporation) was used to calculate contact resistance between the electrode mixture layer molded body and the current collector on the basis of a surface potential distribution obtained when fixed current is caused to flow from the surface of the electrode for a secondary cell produced in the present example. Table 1 shows a result of the calculation.

Example 2

In the present example, an electrode for a secondary cell was produced in the same manner as in Example 1 except that a second roughened surface having an arithmetic average height Sa of 0.134 μm was formed by etching the surface of an aluminum foil having a thickness of 15 μm, and a current collector with the second roughened surface was produced.

The contact resistance between the electrode mixture layer molded body and the current collector was then calculated in the same manner as in Example 1 except that the electrode for a secondary cell produced in the present example was used. A result of the calculation is shown in Table 1.

Example 3

In the present example, an electrode for a secondary cell was produced in the same manner as in Example 1 except that a second roughened surface having an arithmetic average height Sa of 0.242 μm was formed by coating the surface of an aluminum foil having a thickness of 15 μm with a graphite layer having a thickness of 2 μm, and a current collector with the second roughened surface was produced.

The contact resistance between the electrode mixture layer molded body and the current collector was then calculated in the same manner as in Example 1 except that the electrode for a secondary cell produced in the present example was used. A result of the calculation is shown in Table 1.

Example 4

In the present example, an electrode for a secondary cell was produced in the same manner as in Example 1 except that a second roughened surface having an arithmetic average height Sa of 0.239 μm was formed by coating the surface of an aluminum foil having a thickness of 15 μm with a carbon black layer having a thickness of 1 μm, and a current collector with the second roughened surface was produced.

The contact resistance between the electrode mixture layer molded body and the current collector was then calculated in the same manner as in Example 1 except that the electrode for a secondary cell produced in the present example was used. A result of the calculation is shown in Table 1.

Comparative Example 1

In the present Comparative Example, an electrode for a secondary cell was produced in the same manner as in Example 1 except that a current collector having a second roughened surface having an arithmetic average height Sa of 0.044 μm was produced by using an aluminum foil having a thickness of 15 μm with no modification. It can be said that the second roughened surface of the current collector according to the present Comparative Example is substantially smooth.

The contact resistance between the electrode mixture layer molded body and the current collector was then calculated in the same manner as in Example 1 except that the electrode for a secondary cell produced in the present Comparative Example was used. A result of the calculation is shown in Table 1.

Comparative Example 2

In the present Comparative Example, the electrode mixture layer molded body produced in Example 1 was pressed at a pressure of 14 MPa to produce an electrode mixture layer molded body having a first roughened surface having an arithmetic average height Sa of 0.066 μm. It can be said that the first roughened surface of the electrode mixture layer molded body according to the present Comparative Example is substantially smooth.

A current collector having a second roughened surface with an arithmetic average height Sa of 0.242 μm was then produced in the same manner as in Example 3.

An electrode for a secondary cell was then produced in the same manner as in Example 1 except that the electrode mixture layer molded body and the current collector produced in the present Comparative Example were used.

The contact resistance between the electrode mixture layer molded body and the current collector was then calculated in the same manner as in Example 1 except that the electrode for a secondary cell produced in the present Comparative Example was used. A result of the calculation is shown in Table 1.

TABLE 1

| | Arithmetic average height Sa (μm) | | Contact resistance ($\Omega/cm^2$) |
|---|---|---|---|
| | First roughened surface | Second roughened surface | |
| Example 1 | 0.405 | 0.791 | $2.0 \times 10^{-3}$ |
| Example 2 | 0.405 | 0.134 | $4.4 \times 10^{-3}$ |
| Example 3 | 0.405 | 0.242 | $5.6 \times 10^{-3}$ |
| Example 4 | 0.405 | 0.239 | $4.5 \times 10^{-3}$ |
| Comparative Example 1 | 0.405 | 0.044 | Unmeasurable |
| Comparative Example 2 | 0.066 | 0.242 | Unmeasurable |

Table 1 apparently shows that the electrodes for a secondary cell in Examples 1 to 4, in which the first roughened surface of the electrode mixture layer molded body and the second roughened surface of the current collector are pressed and attached to each other, provide small contact resistance between the electrode mixture layer molded body and the current collector that falls within a range from $2.0 \times 10^{-3}$ to $4.4 \times 10^{-3}$ $\Omega/cm^2$, which means that a secondary cell using each of the electrodes can provide excellent output values and input values.

On the other hand, it is apparent that in the electrode for a secondary cell in Comparative Example 1, in which the second roughened surface of the current collector is substantially smooth, and the electrode for a secondary cell in Comparative Example 2, in which the first roughened surface of the electrode mixture layer molded body is substantially smooth, the contact resistance between the electrode mixture layer molded body and the current collector is too large to be measured, which means that a secondary cell using any of the electrodes cannot provide sufficient output values and input values.

What is claimed is:
1. A positive electrode for a secondary cell, the positive electrode comprising:
an electrode mixture layer molded body formed of an active material and at least one selected from the group consisting of a carbon nanotube and a three-dimensional carbon nanotube fiber bundle skeleton formed of a plurality of carbon nanotubes that intersect to form an aggregation, which are in intimate contact with a surface of the active material; and
a current collector layered on the electrode mixture layer molded body,
wherein the electrode mixture layer molded body has a first roughened surface having an arithmetic average height Sa ranging from 0.13 to 0.80 μm at a point of time before the current collector is layered on the electrode mixture layer molded body on a side facing the current collector, and the current collector has a second roughened surface having an arithmetic average height Sa ranging from 0.07 to 0.41 μm at a point of time before the electrode mixture layer molded body is layered with the current collector on a side facing the electrode mixture layer molded body, and
the first roughened surface of the electrode mixture layer molded body and the second roughened surface of the current collector are pressed and attached to each other.

2. The positive electrode for a secondary cell according to claim 1, wherein the current collector is formed of
   a metal foil, and
   a carbon layer made of carbon black or graphite,
   wherein the carbon layer is arranged on a surface of the metal foil, and
   wherein the carbon layer forms the second roughened surface that touches the electrode mixture layer molded body.

3. The positive electrode for a secondary cell according to claim 1, wherein the current collector is formed of a metal foil having an irregular surface comprising metal powder,
   wherein the irregular surface forms the second roughened surface that touches the electrode mixture layer molded body.

* * * * *